(12) United States Patent
Baensch et al.

(10) Patent No.: US 12,241,579 B2
(45) Date of Patent: Mar. 4, 2025

(54) CONNECTOR ARRANGEMENT FOR CONNECTING HEATABLE FLUID LINES

(71) Applicant: VOSS AUTOMOTIVE GMBH, Wipperfürth (DE)

(72) Inventors: Andreas Baensch, Pulheim (DE); Martin Sachse, Wipperfürth (DE); Daniel Häger, Wipperfürth (DE); Eugen Heinrichs, Bergneustadt (DE); Marco Isenburg, Ratingen (DE); Jochem-Andreas Hess, Wipperfürth (DE); Waldemar Wilms, Marienheide (DE); Lukas Röhrig, Marienheide (DE)

(73) Assignee: VOSS Automotive GmbH, Wipperfürth (DE)

( * ) Notice: Subject to any disclaimer, the term of this patent is extended or adjusted under 35 U.S.C. 154(b) by 1133 days.

(21) Appl. No.: 16/970,221

(22) PCT Filed: Feb. 15, 2019

(86) PCT No.: PCT/EP2019/053860
§ 371 (c)(1),
(2) Date: Aug. 14, 2020

(87) PCT Pub. No.: WO2019/158713
PCT Pub. Date: Aug. 22, 2019

(65) Prior Publication Data
US 2021/0140577 A1    May 13, 2021

(30) Foreign Application Priority Data
Feb. 16, 2018 (DE) ..................... 10 2018 103 571.3

(51) Int. Cl.
*F16L 53/38* (2018.01)
*F16L 25/01* (2006.01)
*H01R 13/00* (2006.01)

(52) U.S. Cl.
CPC ............... *F16L 53/38* (2018.01); *F16L 25/01* (2013.01); *H01R 13/005* (2013.01)

(58) Field of Classification Search
CPC ........... F16L 53/38; F16L 41/02; F16L 25/01; H01R 13/005
See application file for complete search history.

(56) References Cited

U.S. PATENT DOCUMENTS 3,673,541 A * 6/1972 Volinskie ............. H01R 13/005
285/119
4,089,101 A * 5/1978 Balon ...................... F16L 41/02
29/523

(Continued)

FOREIGN PATENT DOCUMENTS

DE        8900869 U1    3/1989
DE    102005057780 A1    6/2007

(Continued)

*Primary Examiner* — Umashankar Venkatesan
(74) *Attorney, Agent, or Firm* — Honigman LLP; Eric J. Sosenko; Jonathan P. O'Brien

(57) ABSTRACT

A connector arrangement for connecting heatable fluid lines including at least one first coupling component and at least one second coupling component. The first coupling component and the second coupling component being connectable to each other, and each including at least one first fluid line, at least one first fluid line interface, at least one first electrical conductor, and at least one first electrical interface. The second coupling component includes at least one second fluid lien, and at least one of the first and second coupling components includes at least one fluid line splitter.

21 Claims, 11 Drawing Sheets

(56) References Cited

U.S. PATENT DOCUMENTS

| | | | |
|---|---|---|---|
| 4,815,769 A * | 3/1989 | Hopperdietzel | B60S 1/488 285/47 |
| 6,532,931 B1 * | 3/2003 | Saba | F16L 25/01 123/568.11 |
| 7,165,571 B1 * | 1/2007 | Buzdum | F16L 41/02 285/12 |
| 9,103,481 B2 * | 8/2015 | Schwarzkopf | F16L 25/01 |
| 9,714,009 B2 * | 7/2017 | Caillot | B60S 1/524 |
| 9,777,608 B2 | 10/2017 | Weber | |
| 10,051,689 B2 * | 8/2018 | Cros | B60S 1/3862 |
| 10,071,713 B2 * | 9/2018 | Caillot | B05B 1/24 |
| 10,954,842 B2 * | 3/2021 | Suffner | F16L 53/38 |
| 11,486,529 B2 * | 11/2022 | Röhrig | F16L 51/00 |
| 2002/0058436 A1 * | 5/2002 | Saba | F16L 25/01 439/191 |
| 2006/0196448 A1 * | 9/2006 | Hayworth | F02M 31/12 122/6.6 |
| 2010/0290764 A1 * | 11/2010 | Borgmeier | F16L 25/01 392/468 |
| 2012/0100735 A1 * | 4/2012 | Rosenfeldt | F16L 53/38 439/190 |
| 2012/0167327 A1 * | 7/2012 | Kasack | F16L 29/007 15/250.04 |
| 2013/0330065 A1 | 12/2013 | Schwarzkopf et al. | |
| 2013/0333772 A1 | 12/2013 | Schwarzkopf et al. | |
| 2018/0252345 A1 * | 9/2018 | Häckel | F16L 25/01 |
| 2019/0242512 A1 | 8/2019 | Hackel | |

FOREIGN PATENT DOCUMENTS

| | | | |
|---|---|---|---|
| DE | 102010055520 A1 | 6/2012 | |
| DE | 102013105131 A1 | 11/2014 | |
| EP | 1793152 A1 * | 6/2007 | F16L 25/01 |
| EP | 2816272 A1 | 12/2014 | |
| EP | 3276243 A1 | 1/2018 | |

* cited by examiner

CONNECTOR ARRANGEMENT FOR CONNECTING HEATABLE FLUID LINES

BACKGROUND

The invention relates to a connector arrangement for connecting heatable fluid lines, with at least one first coupling component and at least one second coupling component. The first coupling component and the second coupling component are connectable to each other, for example by being plugged together. The first coupling component and the second coupling component each include at least a first fluid line, at least a first fluid line interface, at least a first electrical conductor, and at least a first electrical interface.

Heatable fluid lines are known in various forms and are used, for example, in fluid distribution systems in motor vehicles. The fluid can be, for example, water for a windshield washing system, or an aqueous urea solution, as is used for the reduction of nitrogen oxides in exhaust gas SCR catalytic converters (SCR=Selective Catalytic Reduction). At low ambient temperatures, the fluid can freeze. Therefore fluid-conducting elements such as pumps or fluid lines are heated, in order to prevent the freezing or to thaw the already-frozen fluid again. To this end, within the fluid system heatable components are connected via fluid lines, wherein these lines can also be heated electrically.

However, the connector arrangements known from the prior art have the disadvantage that in particular in the case of multi-line systems a high cost of adaptation and installation arises.

SUMMARY

The objective of this invention is therefore to provide a connector arrangement, in particular for multi-line systems, wherein the adaptation and installation cost is reduced.

In accordance with the present invention, this objective is achieved by at least the first coupling component and/or at least the second coupling component including at least one fluid line splitter, in particular for the splitting a fluid stream, and the second coupling component including a second fluid line.

The connector arrangement serves to connect heatable fluid lines, for example to connect at least two sections of a fluid line as well as simultaneously connect an electrical conductor, in particular a heating conductor, or connect at least two sections of an electrical conductor. The connector arrangement includes at least one first coupling component and at least one second coupling component. The first coupling component and the second coupling component each include at least one first fluid line, at least one first fluid line interface, at least one first electrical conductor, in particular a heating conductor, and at least one first electrical interface. The first coupling component and the second coupling component are connectable to each other, wherein upon being plugged together at least the first fluid line interface of the first coupling component is connected to the first fluid line interface of the second coupling component, and the first electrical interface of the first coupling component is simultaneously connected to the first electrical interface of the second coupling component.

The connector arrangement is distinguished by the first coupling component and/or the second coupling component including at least one fluid line splitter for splitting a fluid stream guided in the fluid line. Preferably a fluid line splitter is disposed either in the first coupling component or in the second coupling component. The fluid line splitter splits the fluid stream of the first fluid line of the first coupling component or the fluid stream of the first fluid line of the second coupling component into at least two fluid streams. Due to the splitting of the fluid stream, at least two mutually independent delivery points, for example two different points in relation to a catalytic converter or on two catalytic converters of an SCR system, can be supplied. To this end it is provided that the second coupling component includes at least one second fluid line that can conduct the fluid stream to a second delivery point, while the first fluid line of the second coupling component conducts the fluid stream to a first delivery point. For example, it is provided that the fluid line splitter at least partially forms at least the first fluid line interface of the first coupling component or of the second coupling component. The fluid line splitter is preferably disposed within the housing of the first and/or the second coupling component.

The first electrical conductor of the first coupling component is routed along the first fluid line in windings as a heating conductor in order to heat the first fluid line up to the first fluid line interface of the first coupling component. Preferably the first conductor of the first coupling component is at least partially wound at least partially around the first fluid line interface of the first coupling component. Provided the fluid line splitter is disposed within the first coupling component, the first conductor is preferably also at least partially wound around the fluid line splitter.

The first electrical conductor of the second coupling component is preferably routed around the first fluid line of the second coupling component in windings as a heating conductor in order to heat at least the first fluid line of the second coupling component. Preferably the first conductor of the second coupling component is at least partially wound around the first fluid line interface of the second coupling component. Provided the fluid line splitter is disposed within the second coupling component, the first conductor is preferably also at least partially wound around the fluid line splitter.

The connector arrangement according to the invention has the advantage that a single plug-in process simultaneously creates an electrical and a fluidic connection between the first coupling component and the second coupling component. Additionally, a splitting of the fluid stream guided in the fluid line to at least two separate delivery points is affected by the fluid line splitter.

According to a first design of the connector arrangement it is provided that the second fluid line of the second coupling component is connected to the fluid line splitter, preferably that the second fluid line includes a second electrical conductor, in particular a heating conductor. Preferably the fluid line splitter is disposed in the second coupling component and the second fluid line of the second coupling component is preferably connected to the fluid line splitter in a fluid-tight manner or in a one-piece manner. Preferably the fluid line splitter forms the first fluid line interface of the second coupling component. Furthermore, it is preferably provided that the second fluid line includes a second electrical conductor. For example, the second electrical conductor is disposed around the second fluid line as a heating conductor in at least one winding, preferably two windings, so that the second fluid line is heatable. In the case of two windings, one winding is wrapped forward, the other backward around the fluid line, so that the conductor is contactable by two electrical poles at one end of the fluid line. Preferably the first electrical conductor of the second coupling component is also wound around the first fluid line in such a manner that both electrical conductors are contactable in the second coupling component by both electrical poles.

A further design of the connector arrangement provides that the first coupling component and the second coupling component each include a second fluid line interface. Preferably in this case the fluid line splitter is disposed in the first coupling component. Consequently, the fluid line is divided in the first coupling component, so that in the first coupling component and in the second coupling component a second fluid line interface is respectively required. In the second coupling component the first fluid line and the second fluid line are preferably directly connected here to the first fluid line interface or the second fluid line interface.

The first fluid line interfaces or the second fluid line interfaces are preferably formed as a corresponding pair of plug and socket. It is also provided that the plug and socket are respectively transposed in pairs on the first coupling component and the second coupling component, or rather, on the first fluid line interface and the second fluid line interface, so that a connection of the first coupling component and the second coupling component can only be effected in a predetermined orientation. Insofar as the fluid line splitter forms a part of a fluid line interface, it is preferably formed as a socket.

According to a further design of the connector arrangement, it is provided that the first coupling component and the second coupling component each include a second electrical interface. The second electrical interface makes electrical contact with the present fluid line interfaces and the first electrical interface, in particular at the same time, when the first coupling component and the second coupling component are plugged together. The second electrical interface serves—depending upon the design—for the contacting of a second pole, for example—or the contacting of an electrical conductor with a first and second pole.

A further design of the connector arrangement provides that the first electrical interface and/or the second electrical interface of the first coupling component and/or of the second coupling component includes at least one first contact, in particular both electrical interfaces each include at least one first contact and at least one second contact. Depending upon the design of the first coupling component and of the second coupling component, the first electrical interface and the second electrical interface are equipped with only one contact for making electrical contact with a pole, or with two contacts for making electrical contact with each two poles. The specific design is dependent upon the type and the wiring of the electrical conductors that at least partially surround the fluid lines.

The electrical conductors, in particular heating conductors, of the first fluid line and the second fluid line of the second coupling component are preferably wired in series or in parallel. Depending upon the wiring of the electrical conductors, however, there can also be a combined series-parallel circuit of individual sections. It is explicitly emphasized that all circuit and power supply variants lie within the scope of the invention.

In particular, the necessary installation space of the connector arrangement can be reduced according to a further design by it being provided that the center axis of the first fluid line interface and/or the second fluid line interface and/or the first electrical interface and/or the second electrical interface of the first coupling component and/or the second coupling component, in particular in the plugged-in state of the first coupling component and the second coupling component, are disposed within one mutual plane. It is preferable that all four interfaces are disposed in one mutual plane. It can thus be ensured that the connector arrangement is as flat as possible.

Furthermore, it is provided according to one design that the first fluid line interface or first fluid line interfaces and the first electrical interface or first electrical interfaces of the first coupling component and the second coupling component are oriented parallel to an axis of insertion of the first coupling component and the second coupling component. In this case, the axis of insertion is the axis along which the first coupling component and the second coupling component are plugged into one another. Insofar as they are present, it is also preferable that the second fluid line interfaces or second electrical interfaces are each oriented parallel to the axis of insertion.

In particular, the effort required for installation can be reduced according to a further design of the connector arrangement by the electrical conductor of the second coupling component being guided along the first fluid line of the second coupling component as a heating conductor, in particular in two windings, preferably originating from the housing of the second coupling component, one winding going forward and the other backward, so that the first electrical conductor of the second coupling component can make electrical contact with both ends, or rather both poles, on a first end of the fluid line, within the second coupling component. Furthermore, a second electrical conductor of the second coupling component is provided, which at least partially runs along the second fluid line of the second coupling component and is preferably also configured in two windings, namely one running forward and the other backward, along the fluid line, so that the second electrical conductor can also make electrical contact on a first end of the first fluid line with both ends, within the second coupling component.

The first electrical conductor and the second electrical conductor are electrically contactable, for example, via a first electrical interface of the second coupling component having a first contact and a second contact. The first and the second electrical conductors are preferably wired in series, namely such that the first electrical conductor is guided along the first fluid line in a forward-running winding, is guided back to the second coupling component in a second, backward-running winding, makes electrical contact with the second electrical conductor there, which in turn is guided along the second fluid line in a first forward-running winding, and is guided back along the second fluid line in a second backward-running winding, and is connected there with the second contact. Thus, on the second coupling component, the first electrical conductor and the second electrical conductor are electrically contactable via the first electrical interface, which is equipped with two contacts. Preferably, the first interface of the first coupling component is correspondingly equipped so that an electrical supply can be introduced into the second coupling component via the first interface of the first coupling component.

Alternatively it is provided for this purpose that the first electrical conductor and the second electrical conductor are electrically contactable via a first electrical interface of the second coupling component, wherein the first electrical interface is equipped with a first contact, and via a second electrical interface of the second coupling component, wherein the second electrical interface is equipped with a first contact—each having a first pole. Consequently, each of the electrical interfaces contact only one pole for the electrical conductor, in particular a heating conductor. The first electrical conductor and the second electrical conductor are wired in series and the windings are guided respectively in one forward-running winding and one backward-running winding along the fluid line, as is the case in the previously-described exemplary embodiment. Thus, the forward-running winding of the first electrical conductor makes contact with the first electrical interface and the backward-running winding of the second electrical conductor makes contact with the second electrical interface. The first coupling component is correspondingly equipped with two electrical interfaces for contacting one pole each.

Furthermore, it is alternatively provided that the first electrical conductor is electrically contactable via a first electrical interface of the second coupling component, wherein the first electrical interface is equipped with a first contact and a second contact, and the second electrical conductor is electrically contactable via a second electrical interface of the second coupling component, wherein the second electrical interface is equipped with a first contact and a second contact. Thus, the first electrical conductor and the second electrical conductor are always wired in parallel with each other in the second coupling component and guided to each other independently. Nevertheless, they are simultaneously electrically contactable via the first electrical interface and the second electrical interface. For example, it is thus provided that at least one contact of the first electrical interface of the first coupling component and the second electrical interface of the first coupling component are connected to one another in the first coupling component. The first electrical conductor and the second electrical conductor are thus connected in series upon connecting the first coupling component and the second coupling component. On the respective second contact of the electrical interfaces of the first coupling component, the first pole and the second pole of the first electrical conductor of the first coupling component make contact, via which the electrical supply is preferably provided.

According to a further embodiment of the connector arrangement it is provided that the first electrical interface of the first coupling component includes at least one first electrical contact and at least one second electrical contact, that the second electrical interface of the first coupling component includes at least one first electrical contact and at least one second electrical contact, and that in the first coupling component the first contact of the first electrical interface is electrically connected to the first contact of the second electrical interface. It is thereby ensured that despite the presence of two adjacent electrical interfaces, the possibility exists to electrically connect in series the first electrical conductor of the second coupling component and the second electrical conductor of the second coupling component, although both are wired in parallel in the second coupling component, namely in that the contacts between the first electrical interface and the second electrical interface are connected to one another in the first coupling component.

The respective second contact of the first electrical interface and the second electrical interface are each connected to one respective pole of the first electrical conductor of the first coupling component, so that preferably the supply can thereby be provided. For example, the second coupling component correspondingly includes a first electrical interface with a first electrical contact and a second electrical contact as well as a second electrical interface with a first electrical contact and a second electrical contact. The electrical contacts of the first electrical interface and the second electrical interface of the second coupling component are thus each connected respectively with an electrical conductor, in particular a heating conductor, on each respective fluid line.

The variability of the connector arrangement is preferably increased according to a further embodiment in that the second coupling component includes at least two housing components, namely a first housing component with the first fluid line, the first fluid line interface, and the first electrical interface, and a second housing component with the second fluid line, a second fluid line interface, and a second electrical interface. The first housing component and the second housing component together form the second coupling component. Fundamentally, each housing component can be connected separately with the first coupling component. It is also provided that the fluid line splitter is disposed in the first housing component or in the second housing component of the second coupling component. Preferably at least one electrical interface and at least one fluid line interface are formed between the first housing component and the second housing component.

The first electrical interface of the first housing component and the second electrical interface of the second housing component respectively have either two contacts or one contact, depending upon the exemplary embodiment.

In particular the installation of the connector arrangement can be simplified according to a further embodiment in that the first housing component and the second housing component can be connected in a form-locking, tension-locking, or form-and-tension-locking manner, in particular that they can be locked, clamped, or screwed together. For example, the first housing component and the second housing component are connected to one another before being connected to the first coupling component, or they are connected to the first coupling component independently of one another and connect with one another upon connection with the first coupling component.

According to a further embodiment of the connector arrangement, it has proven to be favorable when it is provided that the first housing component and the second housing component additionally each include an electrical cross-connection interface, and that an electrical connection between the first electrical conductor in the first housing component and a second electrical conductor in the second housing component can be created, so that the first electrical conductor and the second electrical conductor are connected in series. This exemplary embodiment is favorable in particular when the first electrical interface of the second coupling component and the second electrical interface of the second coupling component each include only one single contact, so that one respective pole is contactable via one respective electrical interface. Both of the electrical conductors, in particular heating conductors, then make electrical contact in that the first electrical conductor is contacted via the first electrical interface, the first electrical conductor is then guided along the first fluid line of the second coupling component in a forward- and backward-running winding, is electrically connected to the second electrical conductor via the cross-connection interface, where the electrical conductor is likewise disposed along the second fluid line in a forward- and backward-running winding, in order to then be electrically contactable via the second electrical interface of the second coupling component. The cross-connection interface can be formed as a plug-receptacle combination, for example.

According to a further embodiment of the connector arrangement, it has also proven to be favorable when it is provided that the fluid line splitter has a T-shape, an h-shape, or a Y-shape. These shapes have proven to be favorable for the fluid line, as they ensure a compact construction as well as easy manufacturability.

Another favorable embodiment of the connector arrangement provides that the first electrical interface of the second coupling component and the second electrical interface of the second coupling component are disposed on one side of the fluid line interface. In particular, the first electrical interface and the second electrical interface of the second coupling component and the fluid line interface of the second coupling component are disposed in a common imaginary plane. Preferably the first electrical interface of the second coupling component and the second electrical interface of the second coupling component are disposed on a side which faces away from the second fluid line of the second coupling component.

Furthermore, it is preferably provided that the first electrical interface of the first coupling component and the second electrical interface of the first component are disposed on one side of the fluid line interface of the first coupling component. For example, the first electrical interface and the second electrical interface of the first coupling component and the fluid line interface of the first coupling component are disposed in a common plane.

The design described above has the advantage, in particular in the case of exemplary embodiments having a 90° branch in the second coupling component, that the fluid line interface, in particular in the second coupling component, can be placed closer to a housing edge, as the electrical interface is no longer disposed between the branch and the housing edge. The second coupling component can thereby be constructed more compact.

The object of the invention specified initially is further achieved by a first or a second coupling component according to one of the exemplary embodiments described above or a combination thereof.

BRIEF DESCRIPTION OF THE DRAWINGS

Additional favorable embodiments of the invention arise from the following Figure description and the dependent subordinate claims. Shown here:

In the various figures of the illustration, identical components are always marked with the same reference numerals.

DETAILED DESCRIPTION

Figure 1:
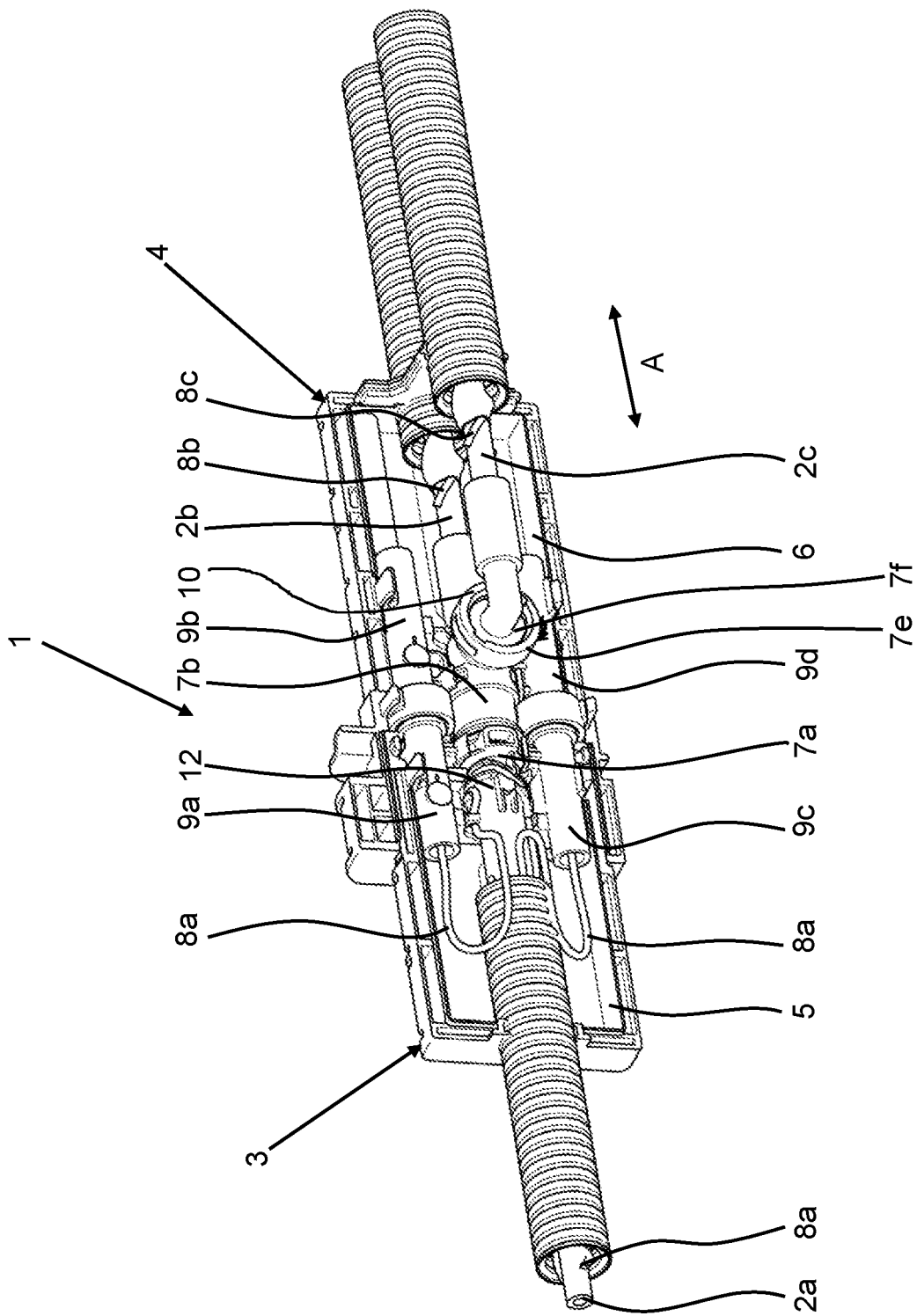
FIG. 1 is an exemplary embodiment of a connector arrangement in partially cut-away side view.

For the following description it is to be noted that the invention is not restricted to the exemplary embodiments and therefore not to all or multiple features of the described feature combinations; rather, each individual partial feature of each and every exemplary embodiment is also meaningful for the object of the invention separately from all other partial features described in combination, and also in combination with any features of another exemplary embodiment.

FIG. 1, FIG. 2, FIG. 3, and FIG. 11 each show an exemplary embodiment of a connector arrangement 1 for heatable fluid lines 2a, 2b, 2c including a first coupling component 3 and a second coupling component 4 in partially cut-away side view. The first coupling component 3 and the second coupling component 4 each respectively include a housing 5, 6. The first coupling component 3 and the second coupling component 4 can be connected to one another by the first coupling component 3 and the second coupling component 4 being moved toward one another parallel to an axis of insertion A and locking together in an interference-fit manner. FIG. 1, FIG. 2, FIG. 3, and FIG. 11 show the first coupling component 3 and the second coupling component 4 in their connected state. The first coupling component 3 and the second coupling component 4 each respectively include a first fluid line 2a, 2b, at least one first fluid line interface 7a, 7b, at least one first electrical conductor 8a, 8b, and at least one first electrical interface 9a, 9b. The second coupling component 4 further includes a second fluid line 2c, which is surrounded by a second electrical conductor 8c of the second coupling component 4.

Figure 11:
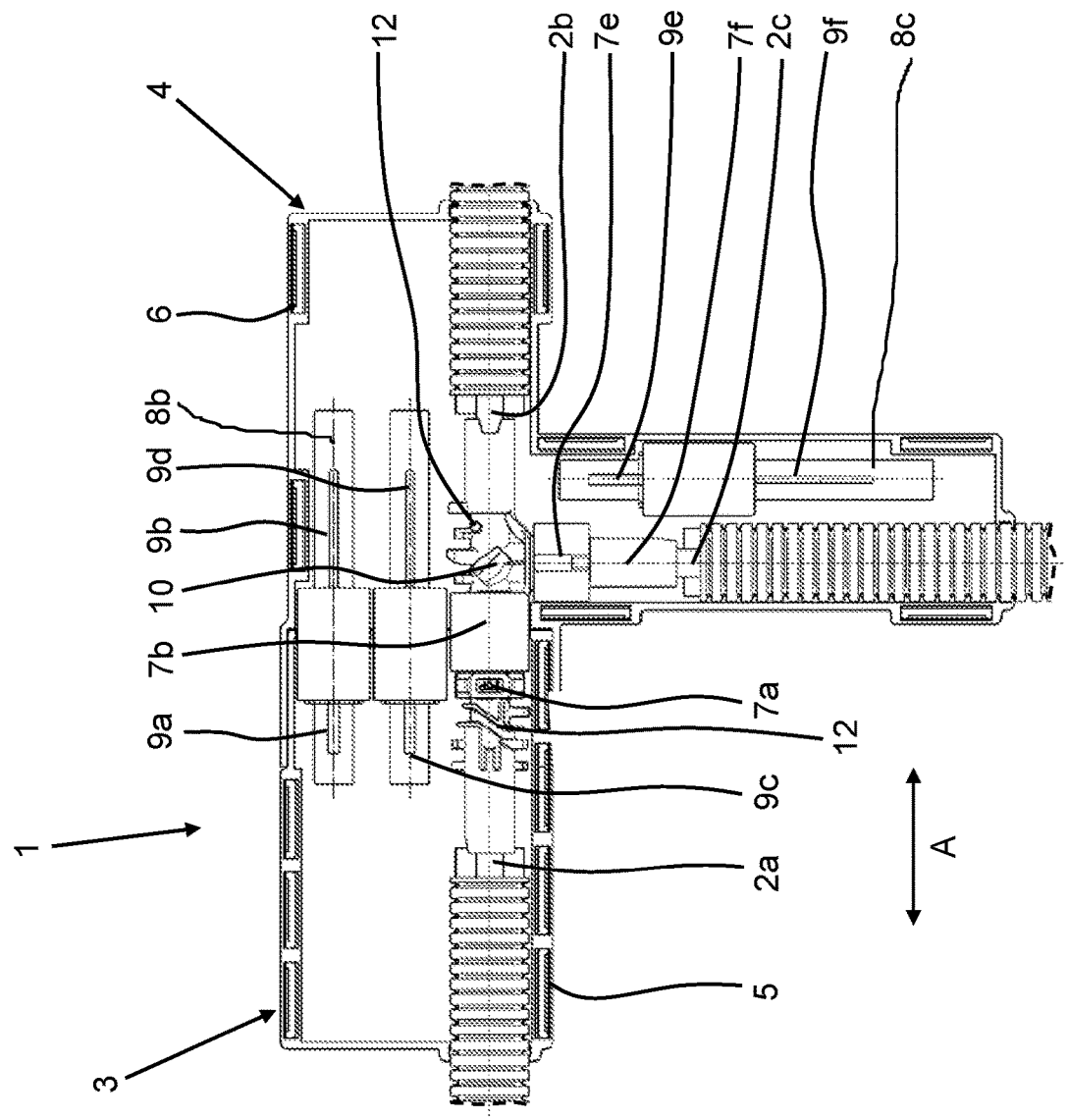
FIG. 11 is a exemplary embodiment of a connector arrangement in partially cut-away side view.

For the sake of clarity, the actual course of the electrical conductors 8a, 8b, 8b [sic] at least partially hidden or not depicted. In FIG. 11, the electrical conductors 8a, 8b, 8c are not depicted.

In the exemplary embodiments depicted in FIG. 1, FIG. 2, FIG. 3, and FIG. 11, the second coupling component 4 includes a fluid line splitter 10 for splitting of a fluid stream. According to FIG. 1, the fluid line splitter 10 is configured T-shaped. According to FIG. 2, the fluid line splitter 10 is h-shaped or fork-shaped, and according to FIG. 3 it is T-shaped, however in comparison to FIG. 1 it has a centrally disposed feed line and different rotational orientation. According to FIG. 11, the fluid line splitter 10 is also designed as T-shaped. The fluid line splitter 10 is connected to the first fluid line 2b of the second coupling component 4 as well as to the second fluid line 2c of the second coupling component 4 in these exemplary embodiments. In these exemplary embodiments the fluid line splitter 10 also forms a part of the first fluid line interface 7b.

Figure 2:
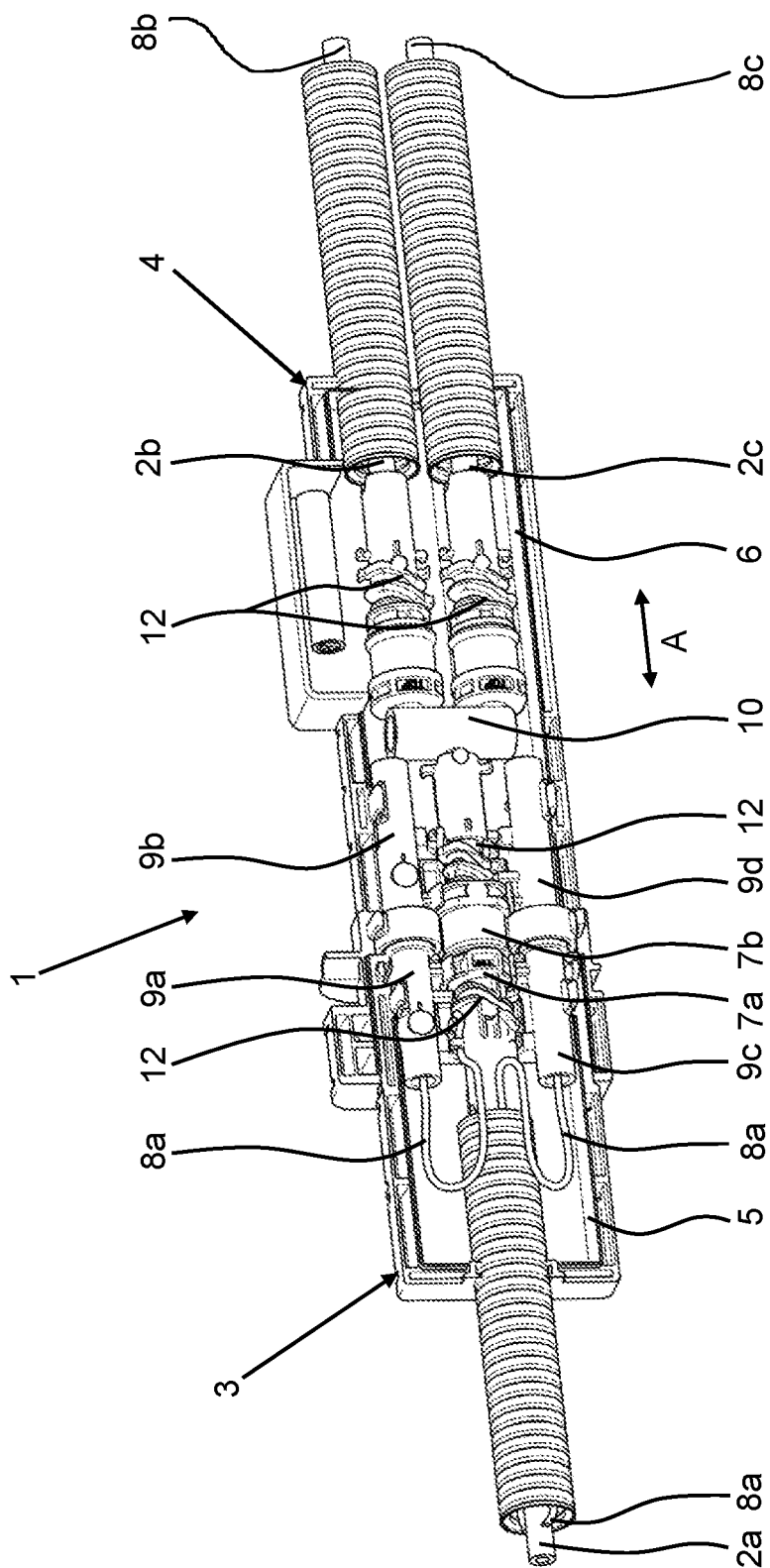
FIG. 2 is an exemplary embodiment of a connector arrangement in a partially cut-away side view.

In the exemplary embodiment according to FIG. 2, the fluid line splitter 10 is designed such that it lies completely in a common plane with the first electrical interfaces 9a, 9b, and the fluid lines 2a, 2b, 2c.

Figure 3:
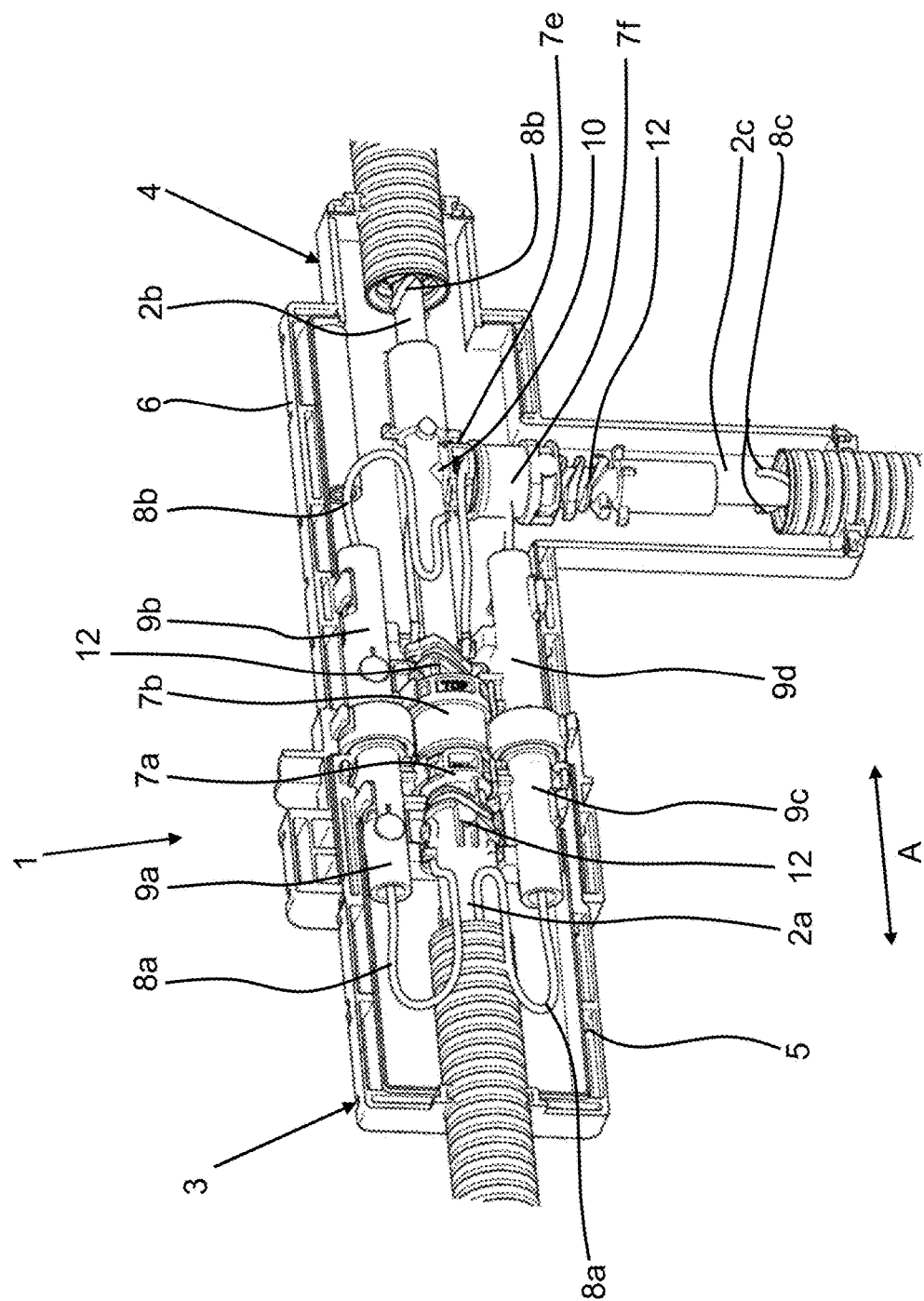
FIG. 3 is an exemplary embodiment of a connector arrangement in partially cut-away side view.

In the exemplary embodiments according to FIG. 3 and FIG. 11, the fluid line splitter 10 is designed such that the first fluid line 2b of the second coupling component 4 and the second fluid line 2c of the second coupling component 4 are disposed at an angle of approximately 90° to each other.

Figure 4:
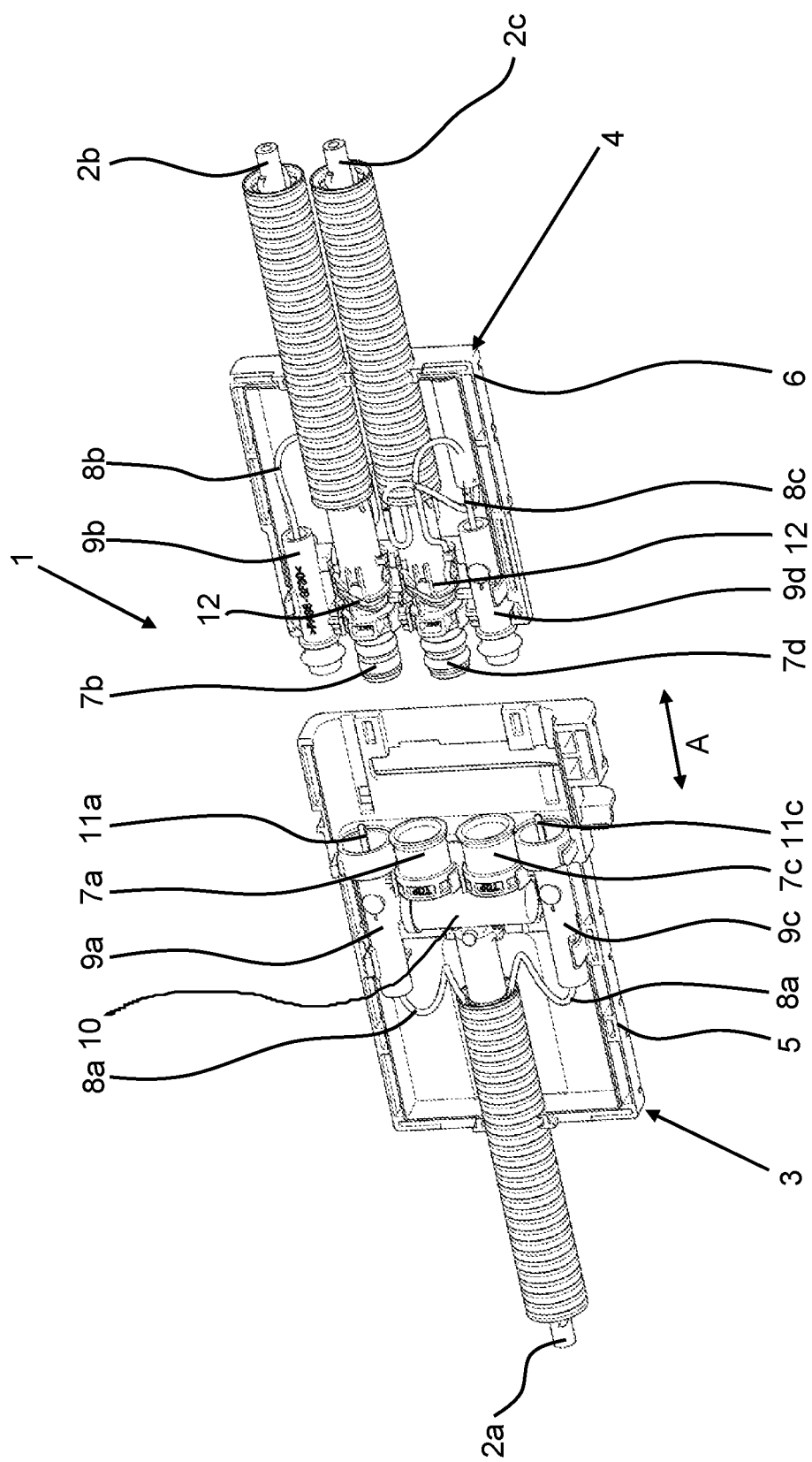
FIG. 4 is an exemplary embodiment of a connector arrangement in partially cut-away side view.

FIG. 4 shows an exemplary embodiment of a connector arrangement 1 including a first coupling component 3 and a second coupling component 4. Each coupling component 3, 4 includes a housing 5, 6. In this exemplary embodiment, the fluid line splitter 10 is designed to be essentially fork-shaped or h-shaped with a central connection of the first fluid line 2a and disposed in the first coupling component 3. Here the fluid line splitter 10 also forms the first fluid line interface 7a as well as a second fluid line interface 7c of the first coupling component 3. The second coupling component 4 also includes a first fluid line interface 7b and a second fluid line interface 7d, which are each respectively directly locked with the first fluid line 2b or with the second fluid line 2c.

In addition to the first electrical interface 9a, 9b, the exemplary embodiments in FIGS. 1 to 3 and FIG. 11 as well as the exemplary embodiment in FIG. 4 also each include a second electrical interface 9c, 9d on the first coupling component 3 and on the second coupling component 4. Each of the electrical interfaces 9a, 9b, 9c, 9d shown in the exemplary embodiments in FIGS. 1 to 4 and FIG. 11 includes a contact 11a, 11b, so that a pole is contactable in each case.

According to the exemplary embodiment in FIG. 11 it is also provided that the electrical interfaces 9b, 9d of the second coupling component 4 are disposed on one side of the fluid line interface 7b, preferably in one plane, and in particular that they are disposed on the side which faces away from the second fluid line 2c of the second coupling component 4. In particular, the electrical interfaces 9a, 9c of the first coupling component 3 are also disposed on one side of the fluid line interface 7a, in particular on the side which faces away from the second fluid line 2c of the second coupling component 4 in the installed state. The second coupling component 4 can thereby be constructed more compactly, as the fluid line interface 7b can be moved closer to the outer edge of the housing 6, as the electrical interface 9d is not disposed therebetween—as is shown in FIG. 3.

In the exemplary embodiment in FIGS. 1 to 4 and FIG. 11, the first electrical conductor 8b of the second coupling component 4 and the second electrical conductor 8c of the second coupling component 4 are wired in series. The electrical supply (of one pole) is provided via the first electrical conductor 8a of the first coupling component 3, namely via the first electrical interface 9a and the first contact 11a located there (see FIG. 4) as well as the first electrical interface 9b of the second coupling component 4, whereupon subsequently the first electrical conductor 8b of the second coupling component 4 is laid around the first fluid line 2b of the second coupling component 4 in a forward- and backward-running winding, in order to then be contacted—starting from the backward-running winding—by a forward-running winding of the second electrical conductor 8c, which is guided along the second fluid line 2c in two windings, forward- and backward-running, in order to then be contacted via the second electrical interface 9d of the second coupling component 4 and the first contact 11b (see FIG. 4) of the second electrical interface 9c of the first coupling component 3 by the second winding of the first electrical conductor 8a of the first coupling component 3.

Figure 5:
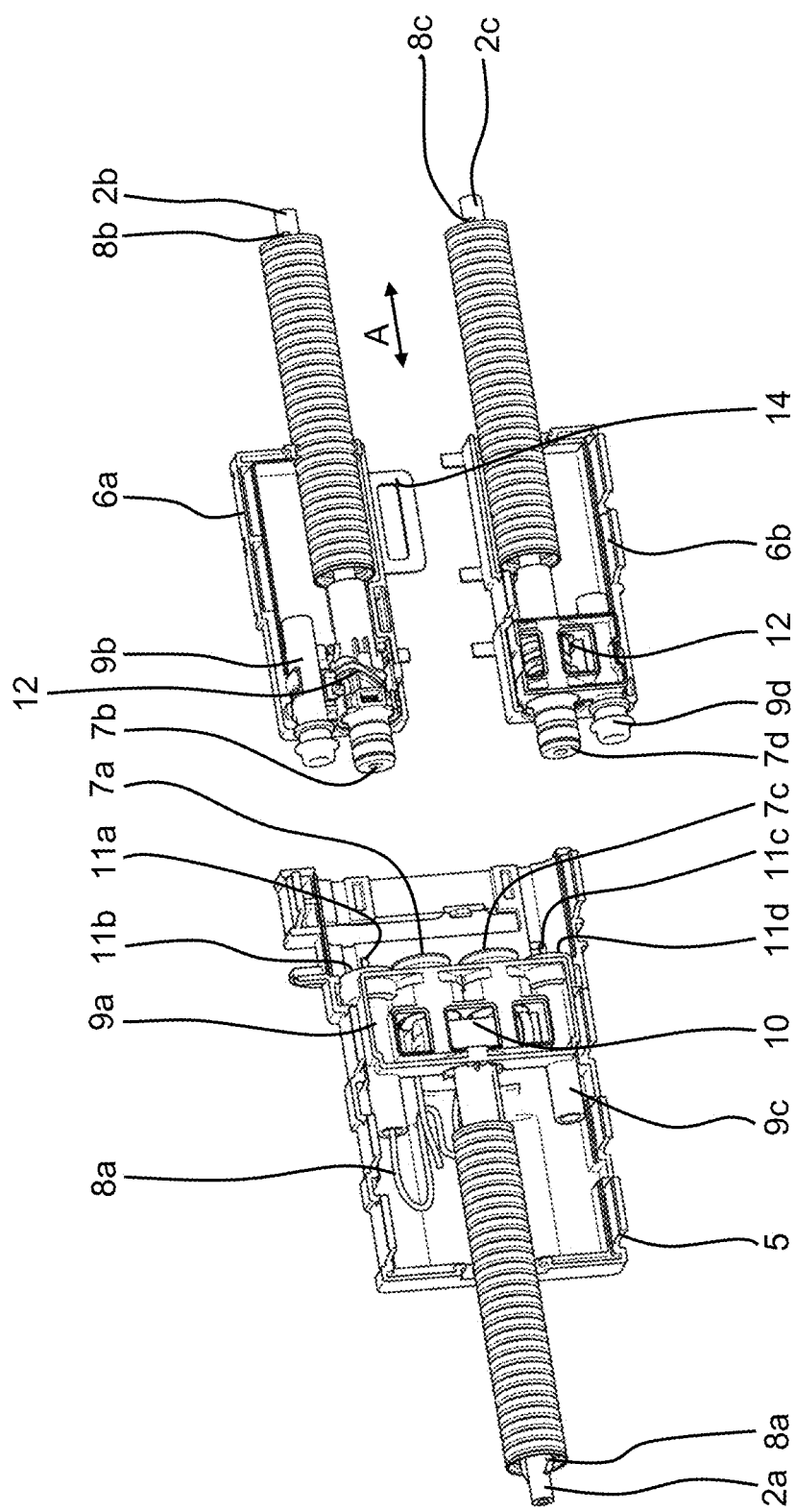
FIG. 5 is an exemplary embodiment of a connector arrangement in partially cut-away side view.

FIG. 5 shows an exemplary embodiment of a connector arrangement 1 including a first coupling component 3 including a housing 5 and a second coupling component 4 which includes two separate housing components 6a, 6b which can be connected to each other. The first housing component 6a of the second coupling component 4 includes the first fluid line 2b, the first electrical conductor 8b, the first fluid line interface 7b, as well as the first electrical interface 9b. The second housing component 6b includes the second fluid line 2c, the second electrical conductor 8c, as well as the second fluid line interface 7d and the second electrical interface 9d.

In this exemplary embodiment according to FIG. 5, the first coupling component 3 comprises the fluid line splitter 10 including the first fluid line interface 7a and the second fluid line interface 7c. The first electrical interface 9a of the first coupling component 3 includes a first electrical contact 11a and a second electrical contact 11b. The second electrical interface 9c of the first coupling component 3 also includes a first electrical contact 11c and a second electrical contact 11d. The first electrical interface 9b and the second electrical interface 9d of the second coupling component 4 also each include two contacts 11e, 11f, 11g, 11h (only shown as examples in FIG. 9). The electrical circuit of the exemplary embodiment in FIG. 5 is shown as an example in FIG. 9.

As the first electrical interfaces 9a, 9b and second electrical interfaces 9c, 9d each include two contacts 11a to 11h (see FIG. 9) in this exemplary embodiment, the first electrical conductor 8b of the first housing component 6a of the second coupling component 4 is contacted exclusively via the first electrical interface 9b of the second coupling component 4 respectively the first electrical interface 9a of the first coupling component 3. Likewise, the second electrical conductor 8c of the second housing component 6b of the second coupling component 4 is contacted exclusively via the second electrical interface 9d of the second coupling component 4 or the second electrical interface 9c of the first coupling component 3. In the first coupling component 3, the first contact 11a as well as the first contact 11b of the second electrical interface 9c are electrically connected to one another, so that the first electrical conductor 8b and the second electrical conductor 8c of the second coupling component 4 in the second coupling component 4 are wired in parallel, however after contacting—that is, the connection of the first coupling component 3 with the second coupling component 4—the first electrical conductor 8b of the second coupling component 4 and the second electrical conductor 8c of the second coupling component 4 are connected in series.

In the exemplary embodiments shown in FIGS. 1 through 5 and FIG. 11, winding areas 12 are at least partially provided on the fluid lines 2a, 2b, 2c or on the fluid line interfaces 7a, 7b, 7c, 7d or on the fluid line splitters 10; in these winding areas 12 one of the relevant electrical conductors 8a, 8b, 8c are wound around the line in order to provide heating for the corresponding sections (not depicted for the sake of clarity).

Figure 6:
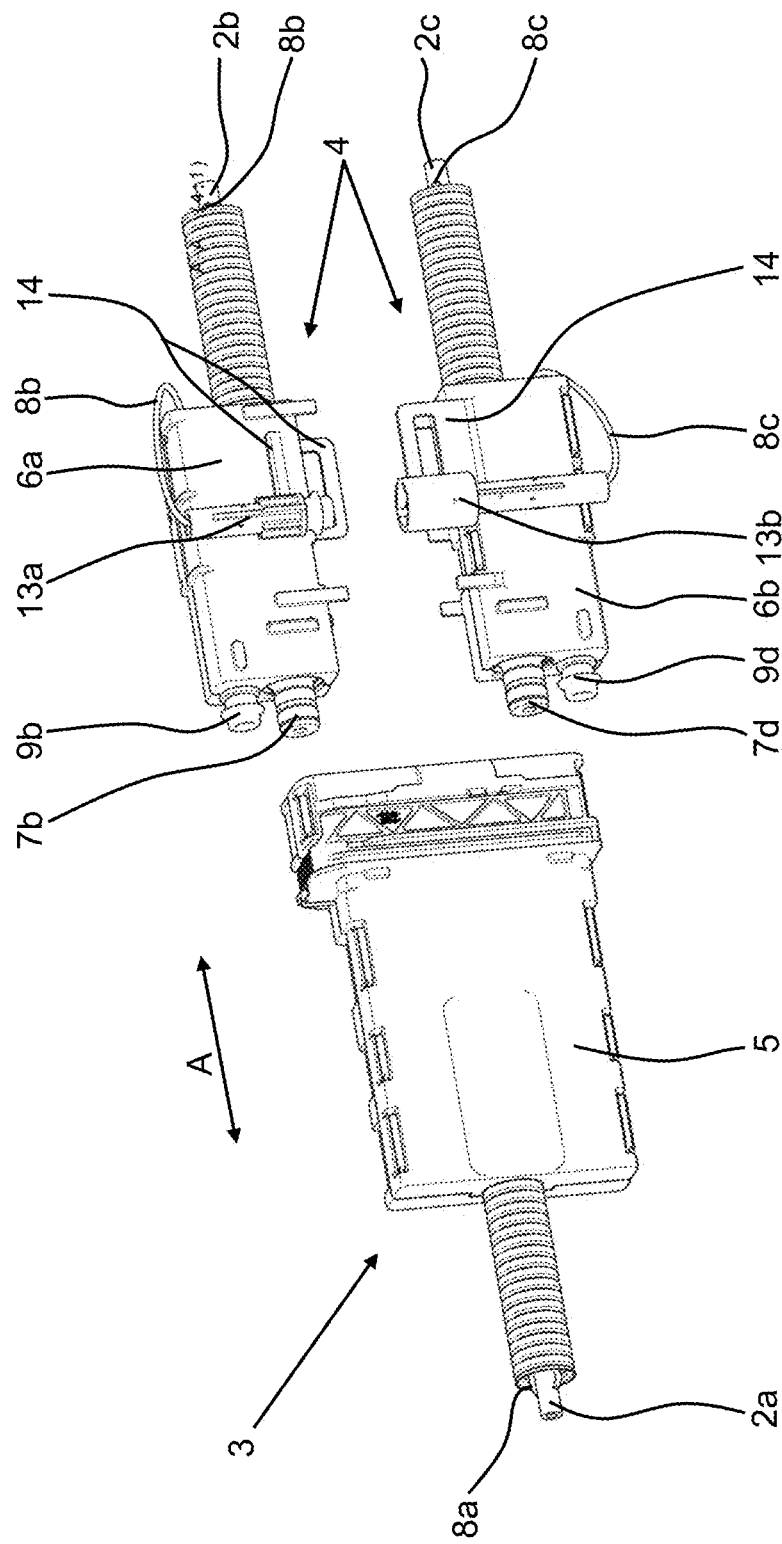
FIG. 6 is an exemplary embodiment of a connector arrangement in partially cut-away side view.

FIG. 6 shows an exemplary embodiment of a connector arrangement 1 wherein the first coupling component 3 is designed the same as in the exemplary embodiment according to FIG. 4. The second coupling component 4 is in turn designed with a first housing component 6a and a second housing component 6b in this exemplary embodiment. Each housing component 6a, 6b includes an electrical cross-connection interface 13a, 13b, which can be connected to each other as a plug-receptacle combination, in order to connect the first electrical conductor 8b of the second coupling component 4 with the second electrical conductor 8c of the second coupling component 4 in series. The electrical circuit of this exemplary embodiment is depicted as an example in FIG. 7 and corresponds—with the exception of the cross-connection component 13a, 13b—to the exemplary embodiments in FIG. 1 through 4, in particular in relation to the forward- and backward-running windings of the first electrical conductor 8b and the second electrical conductor 8c of the second coupling component 4. The first electrical interface 9b of the second coupling component 4 and the second electrical interface 9d of the second coupling component 4 each include only one single contact—as is shown in the exemplary embodiment according to FIGS. 1 through 4. The first housing component 6a and the second housing component 6b include locking elements 14, so that the first housing component 6a and the second housing component 6b can be connected to each other in an interference-fit manner.

Figure 7:
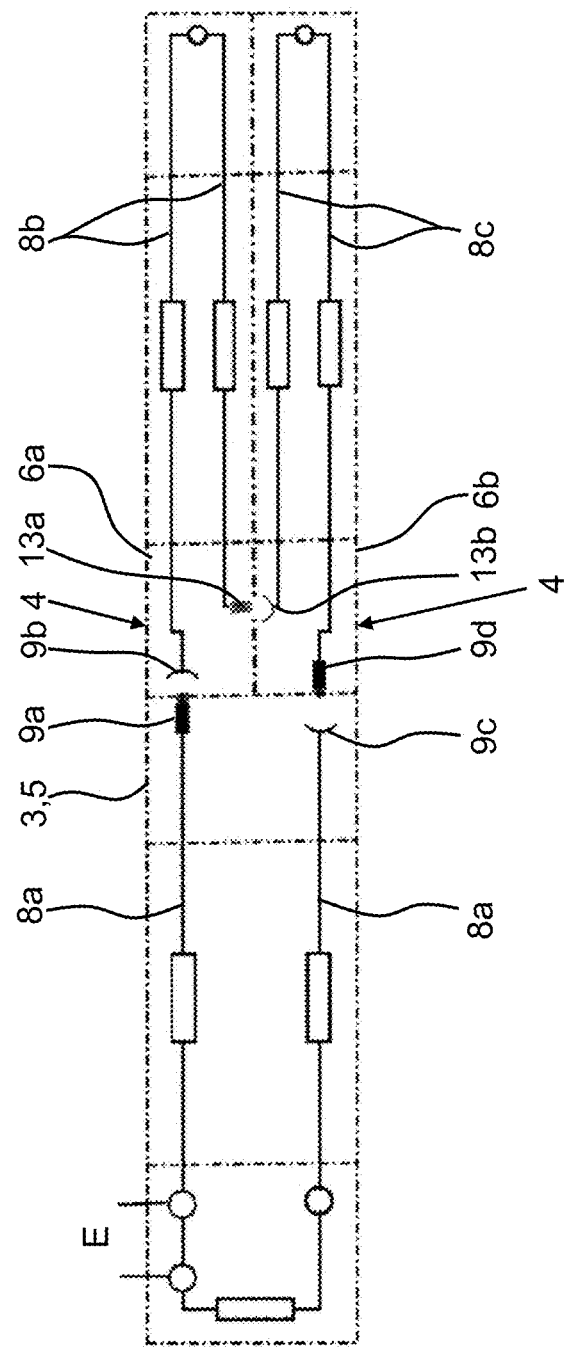
FIG. 7 is an exemplary embodiment of an electrical circuit.

FIG. 7 shows an exemplary embodiment of an electrical circuit according to the exemplary embodiment in FIG. 6. Starting from the electrical supply E, for example the electrical system of a motor vehicle, the first electrical conductor 8a of the first coupling component 3 is connected in a forward-running winding and a backward-running winding with the first electrical interface 9a and the second electrical interface 9b of the first coupling component 3. The first electrical conductor 8b of the second coupling component 4 is also laid in a forward- and backward-running winding, wherein the forward-running winding makes contact with the first electrical interface 9b of the second coupling component 4 and the backward-running winding makes contact with the cross-connection interface 13a. Likewise, the forward-running winding of the second electrical conductor 8c is connected to the cross-connection interface 13b and the backward-running winding of the second electrical conductor 8c of the second coupling component 4 is connected to the second electrical interface 9d.

Figure 8:
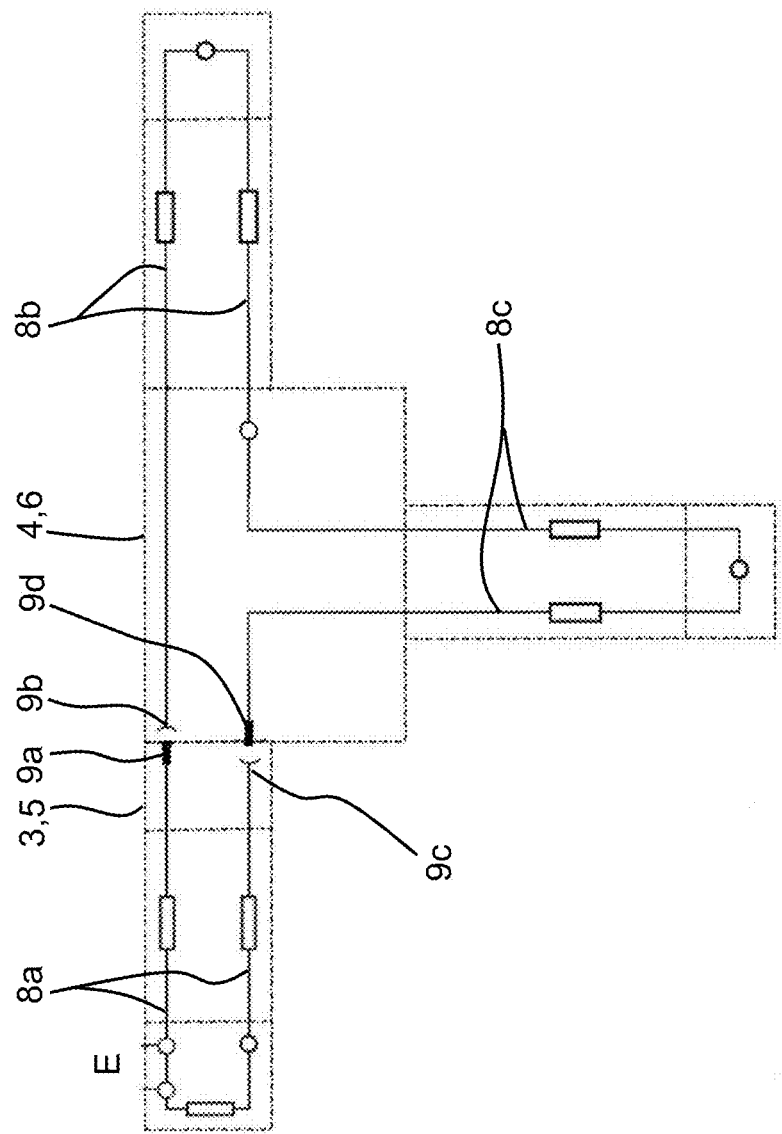
FIG. 8 is a further exemplary embodiment of an electrical circuit.

FIG. 8 shows an exemplary embodiment of an electrical circuit according to the exemplary embodiments in FIG. 1 through FIG. 4 and FIG. 11. Starting from the electrical supply E, for example the electrical system of a motor vehicle, the first electrical conductor 8a of the first coupling component 3 is designed in a forward-running winding and a backward-running winding between the first electrical interface 9a and the second electrical interface 9c of the first coupling component 3. The first electrical conductor 8b of the second coupling component 4 is directly connected to the first electrical interface 9b in its forward-running winding and to the forward-running winding of the second electrical conductor 8c with its backward-running winding, wherein the backward-running winding of the second electrical conductor 8c is connected to the second electrical interface 9d of the second coupling component 4. Each of the electrical interfaces 9a, 9b, 9c, 9d include only one single contact for making contact with a pole.

Figure 9:
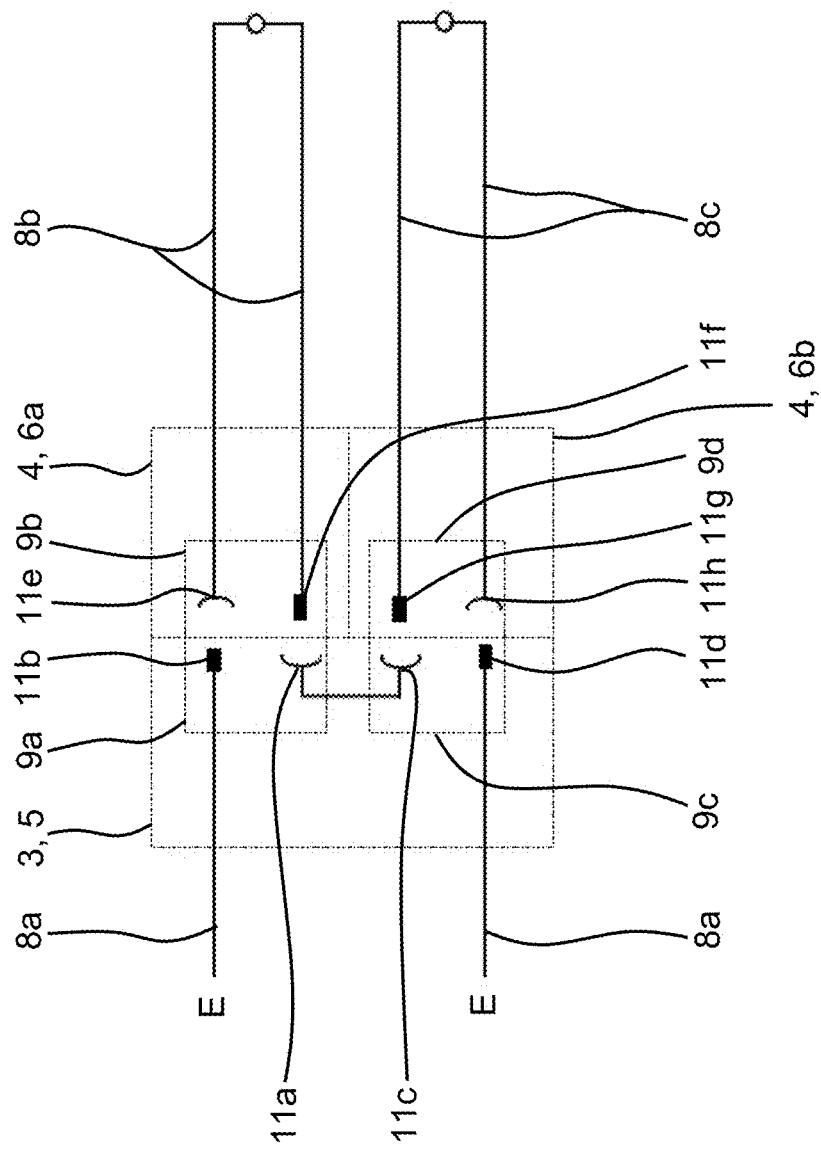
FIG. 9 is a further exemplary embodiment of an electrical circuit.

FIG. 9 shows an exemplary embodiment of an electrical circuit according to the exemplary embodiment in FIG. 5. The first electrical conductor 8a of the first coupling component 3 supplies the second contact 11b of the first electrical interface 9a of the first coupling component 3. The forward-running and the backward-running winding of the first electrical conductor 8b of the second coupling component 4 are connected to a first contact 11e and a second contact 11f via the second electrical interface 9b. The second electrical conductor 8c of the second coupling component 4, or rather, the forward- and backward-running windings of the electrical conductor, are connected to a first contact 11g and a second contact 11h in the second electrical interface 9d. The first electrical contact 11a of the first electrical interface 9a of the first coupling component 3 is electrically connected to the first contact 11c of the second electrical interface 9c of the first coupling component 3 within the first coupling component 3, so that in the contacting state the first electrical conductor 8b of the second coupling component 4 and the second electrical conductor 8c of the second coupling component 4 are electrically connected in series.

Figure 10:
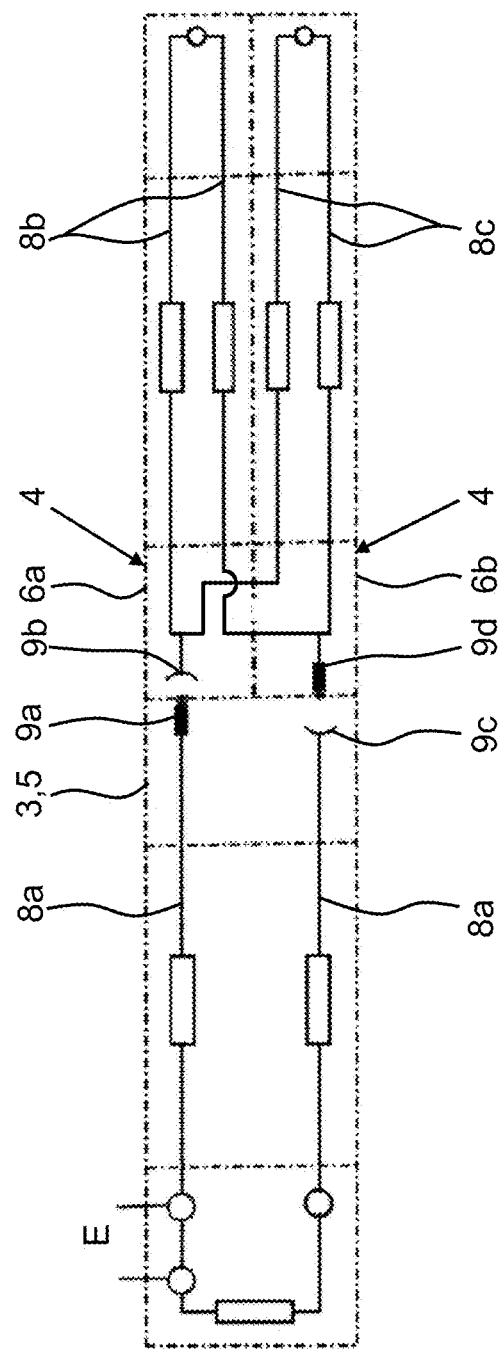
FIG. 10 is a further exemplary embodiment of an electrical circuit.

FIG. 10 shows an exemplary embodiment of an electrical circuit. Starting from the electrical supply E, for example the electrical system of a motor vehicle, the first electrical conductor 8a of the first coupling component 3 is connected in a forward-running winding and a backward-running winding with the first electrical interface 9a and the second electrical interface 9b of the first coupling component 3. The first electrical conductor 8b of the second coupling component 4 is also laid in a forward- and backward-running winding, wherein the forward-running winding is connected to the first electrical interface 9b of the second coupling component 4 and is wired in parallel with a forward-running winding of the second electrical conductor 8c of the second coupling component 4. The backward-running winding of the second electrical conductor 8c of the second coupling component 4 is wired in parallel with the backward-running winding of the first electrical conductor 8b and connected to the second electrical interface 9d. The second coupling component 4 includes a first housing component 6a and a second housing component 6b.

In particular, according to the exemplary embodiments in FIG. 1, FIG. 3, and FIG. 11, the second fluid line 2c of the second coupling element 4 is connected to the fluid line splitter 10 via an additional fluid line interface 7e, 7f.

Furthermore, in particular according to the exemplary embodiment in FIG. 11, an additional electrical interface 9e, 9f is provided on the second coupling component 4 for connection of the electrical conductor 8c—not depicted in FIG. 11.

The invention is not limited to the depicted and described exemplary embodiments, but rather encompasses all designs of equivalent function in the sense of the invention. It is explicitly noted that the exemplary embodiments are not limited to all individual features in combination, but rather each individual feature can be meaningful to the invention independently of all other individual features. Furthermore, the invention has hitherto not been restricted to the combination of features as described in claim 1, but rather can also be defined by any other desired combination of features out of all of the features described in total. This means that in essence practically every individual feature of claim 1 can be omitted or replaced by at least one other feature described elsewhere in this application.

The invention claimed is:

1. A connector arrangement for connecting heatable fluid lines, the connector arrangement comprising: at least one first coupling component and at least one second coupling component, the first coupling component being connectable to the second coupling component, the first coupling component and the second coupling component each include at least one first fluid line, at least one first fluid line interface, at least one first electrical conductor, and at least one first electrical interface, wherein the first fluid line interfaces and the first electrical interfaces are oriented parallel to an axis of insertion of the first coupling component and the second coupling component, and at least one of the first coupling component and the second coupling component includes at least one fluid line splitter, and the second coupling component including at least one second fluid line, wherein at least one of the first fluid line or the second fluid line is connected to the fluid line splitter in a unitary manner.

2. The connector arrangement according to claim 1, wherein the second fluid line is connected to the fluid line splitter.

3. The connector arrangement according to claim 1, wherein the first coupling component and the second coupling component each include a second fluid line interface.

4. The connector arrangement according to claim 3, wherein the first coupling component and the second coupling component each include a second electrical interface.

5. The connector arrangement according to claim 4, wherein at least one of the first electrical interface and the second electrical interface of at least one of the first coupling component and the second coupling component include at least one first contact.

6. The connector arrangement according to claim 5, wherein the first coupling component and the second coupling component each include at least one first contact and at least one second contact.

7. The connector arrangement according to claim 4, wherein each of the first fluid line interface, the second fluid line interface, the first electrical interface, the second electrical interface defines a central axis, and at least two of the central axes are disposed in a common plane.

8. The connector arrangement according to claim 4, wherein the first electrical interface of the first coupling component includes a first electrical contact and a second electrical contact,
that the second electrical interface of the first coupling component includes a first electrical contact and a second electrical contact, and that in the first coupling component the first contact of the first electrical interface is electrically connected to the first contact of the second electrical interface.

9. The connector arrangement according to claim 4, wherein the first fluid line interfaces and the first electrical interfaces are oriented parallel to an axis of insertion of the first coupling component and the second coupling component, and wherein the second fluid line interfaces and the second electrical interfaces are also oriented parallel to the axis of insertion of the first coupling component and the second coupling component.

10. The connector arrangement according to claim 4, wherein the second fluid line interface and the second electrical interface are oriented parallel to the axis of insertion of the first coupling component and the second coupling component.

11. The connector arrangement according to claim 2, wherein the second coupling component includes a second electrical conductor.

12. The connector arrangement according to claim 1, wherein the first electrical conductor of the second coupling component is at least partially guided along the first fluid line of the second coupling component,
a second electrical conductor of the second coupling component is at least partially guided along the second fluid line of the second coupling component, and
the first and second electrical conductors of the second coupling component are electrically coupled together via the first electrical interface of the second coupling component, wherein the first electrical interface is equipped with a first contact and a second contact.

13. The connector arrangement according to claim 1, wherein the second coupling component includes first and second housing components, the first housing component including the first fluid line, the first fluid line interface, and the first electrical interface, and the second housing component including the second fluid line, a second fluid line interface, and a second electrical interface.

14. The connector arrangement according to claim 13, wherein the first housing component and the second housing component are connected to each other in one of an interference-fit, friction-fit, friction-interference fit, latched connection, clamped connection, and screwed connection.

15. The connector arrangement according to claim 13, wherein the first housing component and the second housing component each additionally include an electrical cross-connection interface, the electrical cross-connection interface providing an electrical connection between the first electrical conductor in the first housing component and a second electrical conductor in the second housing component whereby the first electrical conductor and the second electrical conductor of the second coupling component are wired in series.

16. The connector arrangement according to claim 1, wherein the fluid line splitter is one of a T-shape, an h-shape and a Y-shape.

17. The connector arrangement according to claim 1, wherein the first electrical conductor of the second coupling component is at least partially guided along the first fluid line of the second coupling component,
a second electrical conductor of the second coupling component is at least partially guided along the second fluid line of the second coupling component, and
the first and second electrical conductors of the second coupling component are electrically coupled together via the first electrical interface of the second coupling component and a second electrical interface of the second component, each of the first and second electrical interfaces of the second coupling component including a first contact.

18. The connector arrangement according to claim 1, wherein the first electrical conductor of the second coupling component is at least partially guided along the first fluid line of the second coupling component,
a second electrical conductor of the second coupling component is at least partially guided along the second fluid line of the second coupling component, and
the first electrical conductor of the second coupling component being electrically contactable via the first electrical interface of the second coupling component, the first electrical interface of the second coupling component including first contact and a second contact, and the second conductor of the second coupling component being electrically contactable via a second electrical interface of the second coupling component, the second electrical interface including a first contact and a second contact.

19. A connector arrangement for connecting heatable fluid lines, the connector arrangement comprising:
at least one first coupling component;
at least one second coupling component, the first coupling component being directly connected to the second coupling component;
the first coupling component and the second coupling component each include at least one first fluid line, at least one first fluid line interface, at least one first electrical conductor, and at least one first electrical interface;
wherein the first fluid line interfaces and the first electrical interfaces are oriented parallel to an axis of insertion of the first coupling component and the second coupling component;
at least one of the first coupling component and the second coupling component includes at least one fluid line splitter, the fluid line splitter being disposed between the first fluid line of first coupling component and the first fluid line of the second coupling component; and the second coupling component including at least one second fluid line.

20. The connector arrangement according to claim 19, wherein at least one of the first fluid line or the second fluid line is unitary with the fluid line splitter.

21. A coupling component of a connector arrangement for connecting heatable fluid lines, the coupling component comprising: at least one first fluid line, at least one first fluid line interface, at least one first electrical conductor, at least one first electrical interface, at least one second electrical interface, and at least one fluid line splitter, wherein the first fluid line is connected to the fluid line splitter in a unitary manner, and wherein the first electrical interface of the coupling component and the second electrical interface of the coupling component are arranged at one side of the first fluid line interface.

\* \* \* \* \*